Feb. 2, 1971 W. C. G. ORTEL 3,560,962

ANALOG-TO-DIGITAL ENCODER

Filed March 6, 1968 2 Sheets-Sheet 1

INVENTOR
W. C. G. ORTEL
BY Lucian C. Canepa
ATTORNEY

United States Patent Office 3,560,962

Patented Feb. 2, 1971

3,560,962

ANALOG-TO-DIGITAL ENCODER

William C. G. Ortel, New York, N.Y., assignor to Bell Telephone Laboratories, Incorporated, Murray Hill, N.J.

Filed Mar. 6, 1968, Ser. No. 710,959

Int. Cl. H03k *13/20*

U.S. Cl. 340—347 5 Claims

ABSTRACT OF THE DISCLOSURE

The modulated output of a variable-frequency oscillator included in an analog-to-digital encoder is processed to abstract therefrom signals for synchronizing the operation of a sampling pulse generator included in the encoder.

This invention relates to the translation of electrical signals and more particularly to analog-to-digital encoders.

BACKGROUND OF THE INVENTION

It is known to convert an analog input signal into a set of digital quantities by having the input signal control the frequency of a variable-frequency oscillator. In such an encoder, the output of the oscillator is applied to a counter whose representation is sampled at regularly-recurring intervals to provide successive digital output indications. In order to achieve an accurate correspondence between the input signal and the output indications, it is apparent that the sampling signals must be maintained in a predetermined relationship with respect to the quiescent or unmodulated center frequency output of the oscillator. Of course, if an unmodulated output is available from the oscillator, such an output can be used directly to synchronize the sampling operation. However, in certain types of oscillator, for example those of the Klystron or relaxation type, no unmodulated signal would be directly avaliable therefrom. Accordingly, in encoders including this latter type of oscillator, some technique not dependent upon the availability of an unmodulated output from the oscillator must be devised.

SUMMARY OF THE INVENTION

An object of the present invention is an improved analog-to-digital encoder.

More specifically, an object of this invention is to derive signals from the modulated output of the variable-frequency oscillator of an analog-to-digital encoder for synchronizing the operation of a sampling pulse generator included in the encoder.

These and other objects of the present invention are realized in a specific illustrative embodiment thereof that comprises an improved encoder of the analog-to-digital type. The encoder includes a variable-frequency oscillator whose output frequency is determined by the time rate of change of an input analog signal to be encoded. The output of the oscillator is applied to a unidirectional recycling N-scale counter whose representation is sampled at regular intervals to provide successive digital output indications. A second (M-scale) counter is driven by the output of the N-scale counter. In accordance with the proposed encoding procedure, the input analog signal is constrained both in amplitude and in its time rate of change. Accordingly, integral multiples of N signals (indicated by the second counter) are confined to occur within a prescribed interval of time around the time at which a sampling pulse should ideally occur. The output signals from the second counter do not have an exact periodicity, but each fluctuate in time within the prescribed interval. These output signals are applied to a first resonant circuit whose characteristic period is selected to be equal to the ideal output period of the second counter. This characteristic period is large relative to the constrained fluctuations in time of the output of the second counter. Hence, the phase of the wave excited in the first resonant circuit fluctuates within an interval that is smaller than the prescribed interval.

In turn, the wave output of the first resonant circuit is applied to a first generator that provides pulses in respective coincidence with the positive-going zero-crossings of the noted wave output. These pulses are applied to a second resonant circuit whose characteristic period is selected to be equal to the ideal sampling period. The applied pulses serve to excite a wave in the second circuit. The phase of this excited wave fluctuates within an interval that is smaller than that characteristic of the first circuit. The wave output of the second resonant circuit is applied to a second generator that provides the pulses that are actually employed to synchronize the desired sampling operation.

By proper selection of the quality factors of the first and second resonant circuits, the phase deviation of the output of the second circuit can be made sufficiently small to ensure precise synchronized sampling of the aforementioned N-scale counter.

It is a feature of the present invention that an analog-to-digital encoder that includes a recycling N-scale counter be synchronized by timing circuitry that is responsive to integral multiples of N signals provided by the counter.

It is another feature of this invention that the specified timing circuitry include an M-scale counter adapted to register multiples of N signals and to provide a fluctuating output to drive a first resonant circuit whose characteristic period is large relative to the fluctuations.

It is still another feature of the present invention that the timing circuitry include a second resonant circuit driven by pulses derived from the output of the first resonant circuit, the characteristic period of the second resonant circuit being 1/M that of the first circuit and being equal to the ideal sampling period for the N-scale counter.

BRIEF DESCRIPTION OF THE DRAWING

A complete understanding of the present invention and of the above and other features and advantages thereof may be gained from a consideration of the following detailed description of an illustrative embodiment thereof described hereinbelow in connection with the accompanying drawing, in which.

DETAILED DESCRIPTION

Figure 1:
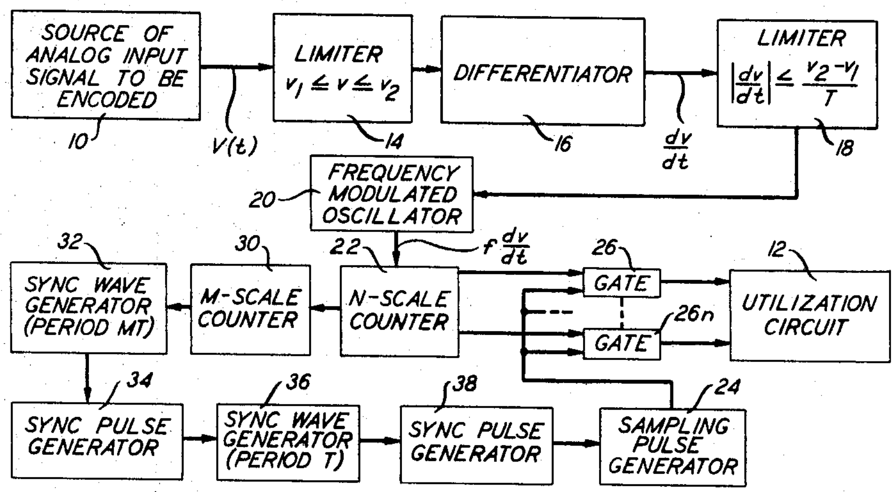
FIG. 1 is a block diagram representation of an analog-to-digital encoder made in accordance with the principles of the present invention.

The specific illustrative encoder shown in FIG. 1 is adapted to convert an analog input signal supplied by a source 10 into a corresponding set of digital quantities and to apply those quantities to a utilization circuit 12. The output of the source 10 is designated in FIG. 1 as constituting a voltage signal $v(t)$ that is a function of time. In accordance with the principles of the present invention, this analog signal is constrained to have minimum and maximum values $v_1$ and $v_2$, respectively. Such constraints may be inherent in the nature of the source 10 or as shown in FIG. 1 may be imposed by a conventional limiter 14. The input signal is then processed by a conventional differentiator 16 which provides a signal proportional to the time rate of change of $v(t)$. This signal is then further constrained, by limiter 18, to ensure that the time rate of change of the signal to be encoded does not exceed the quantity $$\frac{v_2-v_1}{T}$$

where T is the ideal sampling period, which will be discussed in more detail below.

The output of the limiter 18 is applied to a conventional frequency modulated oscillator 20 whose output frequency, designated $$f\left(\frac{dv}{dt}\right)$$

is adapted to vary as a linear function of the applied input signal. In turn, the output of the oscillator 20 is applied to a unidirectional recycling N-scale counter 22 which is incremented by one counting step in response to each pulse or positive-slope zero-crossing of the output waveform of the oscillator 20. In this way, the counter 22 integrates the variable-frequency oscillatory output and thereby in effect reproduces the input signal $v(t)$. The state of the counter 22 is sampled at regular intervals T by applying pluses from a sampling pulse generator 24 to gates 26 . . . 26*n*. As a result of this sampling operation, signals representative of the digital states of the respective stages of the counter 22 are periodically applied to the utilization circuit 12.

In accordance with the principles of the present invention, the sampling pulse generator 24 is synchronized by timing circuitry that is responsive to the output of the N-scale counter 22. This circuitry includes a unidirectional recycling M-scale counter 30, a synchronization wave generator 32 having a characteristic period MT and a quality factor $Q_1$, a synchronization pulse generator 34, a synchronization wave generator 36 having a characteristic period T and a quality factor $Q_2$, and a synchronization pulse generator 38.

It is significant to note that the counters 22 and 30 included in the arrangement of FIG. 1 operate in a recycling fashion. As a result, the additional complexity of resetting circuitry therefor is avoided. Furthermore, a considerable speed advantage is gained from this type of operation because no resetting or settling time for the counters is required.

Figure 2:
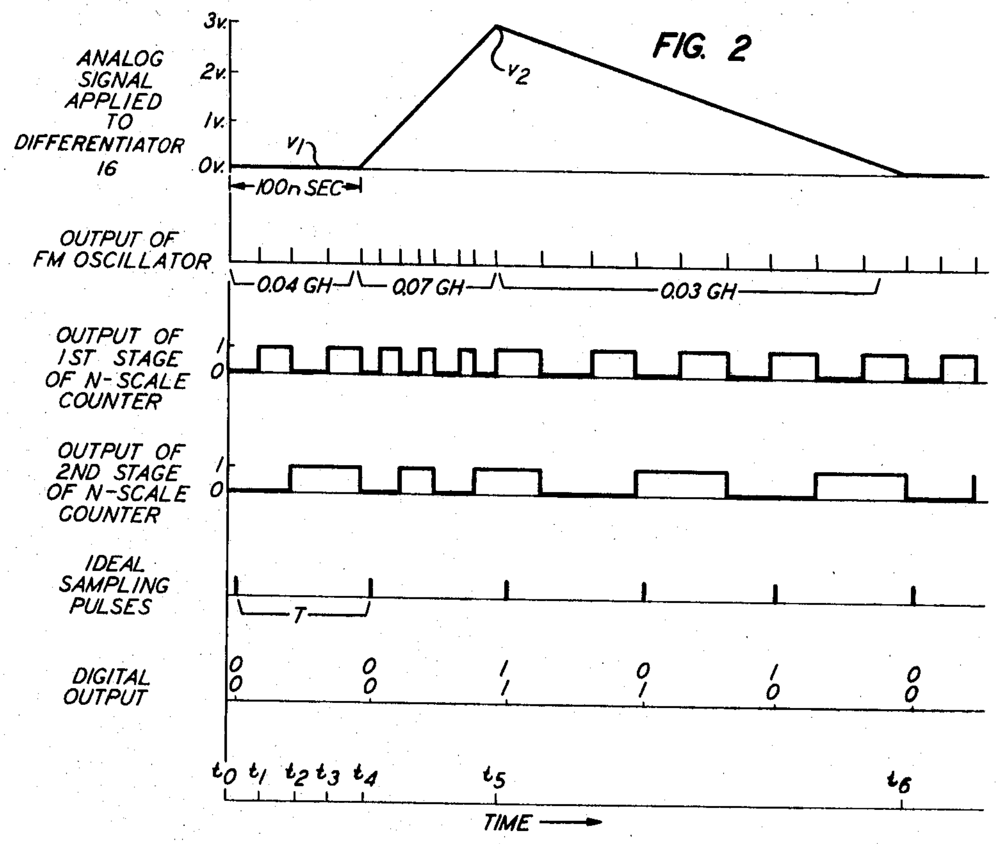
FIGS. 2 through 4 depict various waveforms that are helpful in explaining the mode of operation of the encoder shown in FIG. 1.

The overall mode of operation of the exemplary encoder shown in FIG. 1, and in particular the unique manner in which the specified timing circuitry is effective to synchronize the generator 24, can be understood best by selecting an illustrative set of parameters for the encoder and then following through a typical operation thereof. To start with, assume that the analog signal applied to the differentiator 16 is limited to the particular minimum and maximum values ($v_1=0$ volts, $v_2=+3$ volts, respectively) shown in the topmost waveform of FIG. 2. Assume further that the depicted signal is characterized by a maximum time rate of change of 3 volts per 100 nanoseconds. Such a signal can be accurately encoded if the ideal sampling interval is selected to be less than $$\frac{1}{2f_o}$$

where $f_o$ is the highest frequency component in the analog input signal to be encoded. If, for example, $f_o$ is 5 megahertz, an interval of 100 nanoseconds would be adequate to accomplish the desired sampling. Accordingly, the regularly-recurring sampling pulses shown in the next-to-the-last row of FIG. 2 are indicated as occurring with a period of 100 nanoseconds.

The counting modulus N selected for the N-scale counter 22 (FIG. 1) is chosen to be greater than $$\frac{v_2-v_1}{s}$$

where $s$ is the quantum step or the range of input signal to be represented as a unit digital output. Thus, if a 0 to 3 volt signal is to be encoded in one-volt steps ($s=1$), N must be greater than 3. Herein N will be assumed to be 4. Hence, the unit 22 is assumed to constitute a 2-stage binary counter. A count of three therein will be considered to correspond to 3 volts and a count of zero to 0 volts.

The output frequency $f$ of the oscillator 20 is given by $$f=\frac{N}{T}\left(1+\frac{dv/dt}{k}\right) \quad (1)$$

where N, T and $dv/dt$ are specified above and $k$ is defined as the modulation constant of the oscillator. This constant is selected to provide the desired ratio of analog input $v$ to digital output $c$. That is $$k=\frac{N_v}{T_c} \quad (2)$$

The oscillator's center frequency $f_c$, which is to be produced whenever the input signal is constant ($dv/dt=0$), is selected from the set of frequencies $JN/T$, where $J=1, 2, 3$ . . . When the oscillator is provided any one of these frequencies, the output of the counter 22 remains the same from one sampling instant to another. When the signal does not remain constant, the oscillator's frequency deviates from $f_c$ in proportion to the rate of increase or decrease in a manner such that the number of oscillatory cycles supplied to the counter 22 during a sampling interval is not an integral multiple of N. In order to ensure that a changing signal will be represented by a change in the sampled count, it is important that neither the excess nor the deficiency in the number of cycles occurring in any sampling interval be as great as N. In other terms, $$\frac{N}{kT}(v_2-v_1)\leq N-1 \quad (3)$$

This places a restriction on $k$:

$$k\geq\frac{N}{N-1}\left(\frac{v_2-v_1}{T}\right) \quad (4)$$

If $k$ is selected to make the digital outputs $c_2$ and $c_1$ correspond to input levels $v_2$ and $v_1$, then $$\frac{N}{T}\left(\frac{v_2-v_1}{c_2-c_1}\right)\geq\frac{N}{N-1}\left(\frac{v_2-v_1}{T}\right) \quad (5)$$

or $$c_2-c_1\leq N-1 \quad (6)$$

Thus, for the illustrative case in which $N=4$, $T=100$ nanoseconds, 3 volts corresponds to a count of three and 0 volt to a count of zero, $k$ is equal to 0.04 volt per nanosecond. If $J=1$, it is apparent from Equation 1 that $f_c=0.04$ gigahertz. And the maximum and minimum frequencies provided by the oscillator 20 are given by the following expressions:

$$f_{max}=\frac{N}{T}\left(1+\frac{v_2-v_1}{kT}\right) \quad (7)$$

$$f_{min}=\frac{N}{T}\left(1-\frac{v_2-v_1}{kT}\right) \quad (8)$$

By way of illustration, a signal that increases from 0 to 3 volts in 100 nanoseconds, represented, for example, in the interval $t_4$ through $t_5$ in the topmost waveform of FIG. 2, will cause the oscillator 20 to provide an output frequency ($f_{max}$) of 0.07 gigahertz. A signal that decreases from 3 to 0 volts in 100 nanoseconds will cause the oscillator to provide an output ($f_{min}$) at 0.01 gigahertz.

The variable-frequency output of the oscillator 20 is represented in pulse form in the second row of FIG. 2. As indicated there, the output of the oscillator remains constant at $f_c$ (0.04 gigahertz) during the time interval designated $t_0$ through $t_4$. During this interval the time rate of change of the input signal applied to the differentiator 16 is zero. In the interval $t_4$ through $t_5$, $dv/dt=0.03$ volt per nanosecond and, as a result, the output of the oscillator 20 is a pulse train at $f_{max}$ (0.07 gigahertz). (In the interval $t_4$ through $t_5$, $dv/dt$ is a positive constant. Hence, during this interval a positive invariant bias signal is applied to the oscillator 20 by the limiter 18. In a conventional manner this signal is superimposed on a steady-state bias applied to the oscillator 18 to cause it quiescently to provide an output at its center frequency $f_c$.) In the interval $t_5$ through $t_6$ the signal applied to the differentiator 16 decreases at a rate of 0.01 volt per nanosecond, as depicted in the topmost waveform of FIG. 2. Accordingly, in the interval $t_5$ through $t_6$, $dv/dt$ is a negative constant. Hence, during this interval a negative invariant bias signal is applied to the oscillator 20 by the limiter 18. Illustratively, the absolute value of this negative bias signal is one-third that of the absolute value of the aforementioned positive bias signal. Therefore, during the interval $t_5$ through $t_6$ the superposition of this negative signal on the above-assumed steady-state bias causes the output frequency of the oscillator to be 0.03 gigahertz, as indicated in FIG. 2.

In response to the oscillatory pulses shown in FIG. 2, the counter 22 respectively steps through its four stable states in a recycling manner. The successive binary conditions of the two stages of the counter 22 are represented in FIG. 2. (It is assumed that the counter 22 initially registers the indication 11 and that the first or leftmost pulse from the oscillator 20 is effective to cycle the counter to its 00 state.) If the state of the counter 22 is sensed by the ideal sampling pulses shown in FIG. 2, the respective counter indications gated to the utilization circuit 12 will be the 2-digit binary numbers listed in the bottom row of FIG. 2. Comparison of these numbers with the corresponding values of the analog signal represented by the topmost waveform reveals that successive values of the analog signal have in fact been translated to exact digital counterparts thereof.

It is manifest that the output of the sampling pulse generator 24 must be synchronized with respect to the center-frequency output of the oscillator 20. As indicated above, the ideal sampling period for the particular illustrative system considered herein is 100 nanoseconds. However, it is not possible simply to rely on the inherent accuracy of the generator 24 to supply these ideal sampling pulses. No matter how stable this generator is, its period is bound to differ from the desired one by some factor $(1+d)$. Even though $d$ may be a very small fraction for a well designed generator, the sampling pulses will nevertheless continually drift farther and farther out of phase from their ideal positions. Even if $d$ were as small as $10^{-9}$, a system with N=4 and T=100 nanoseconds would drift by 25 nanoseconds in 2.5 seconds. The digital output would be in error by one level after this short time and by proportionally greater amounts as time went on.

In accordance with the principles of the present invention, the out-of-synchronism drift mentioned above is eliminated in a unique manner. This is accomplished by utilizing synchronization information that is embodied in the output of the oscillator 20, which information stems from the aforementioned constraints imposed on input signals and from the particular nature of the described system. Specifically, the synchronization technique to be described is based on the recognition that integral multiples of N signals must always occur within a range of time that is limited to $$\pm\left(\frac{N-1}{N}\right)T$$

around the time at which a sampling pulse should ideally occur. Such integral multiples of N signals are counted by the M-scale counter 30. Illustratively, the scale of the counter 30 is selected to be greater than that of the counter 22, although it need not be. Herein, for illustrative purposes, M will be assumed to be 5. Hence, the counter 30 will provide an output signal in response to each 20 $(M\times N)$ signals generated by the oscillator 20.

Each of the output signals provided by the counter 30 can vary within a time interval that is limited to $$\pm\left(\frac{N-1}{N}\right)T$$

around the time at which these output signals would occur if the counter 22 were driven by a constant-frequency train of pulses of frequency $f_c$. Thus, the output pulses provided by the counter 30 are characterized by a period that falls within the range $$T\left(M\pm\frac{N-1}{N}\right) \qquad (9)$$

Figure 3:
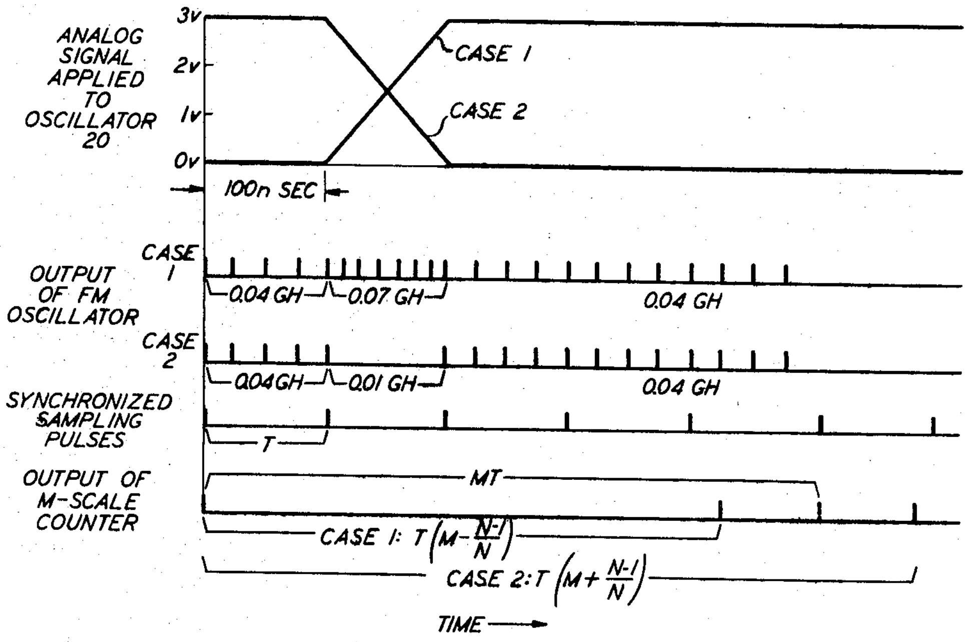

FIG. 3 illustrates the particular manner in which the period of the output signals provided by the M-scale counter 30 varies as a function of two extreme types of analog signals applied to the oscillator 20. In FIG. 3 the two analog signal waveforms designated case 1 and case 2 respectively represent (1) a signal that makes a positive-going transition between its minimum and maximum values within a single sampling period, and (2) a signal that makes a negative-going transition between its maximum and minimum values within such a period. These two cases illustrate the extreme deviations that can occur in the encoding system insofar as a count of integral multiples of N signals is concerned. As indicated in FIG. 3, for the case 1 situation the M-scale counter 30 will provide an output signal after $$T\left(M-\frac{N-1}{N}\right)$$

or 425 nanoseconds. For the case 2 waveform the counter 30 provides an output signal after $$T\left(M+\frac{N-1}{N}\right)$$

or 575 nanoseconds. The nominal output period of the counter 30 is indicated to be MT or 500 nanoseconds.

Figure 4:
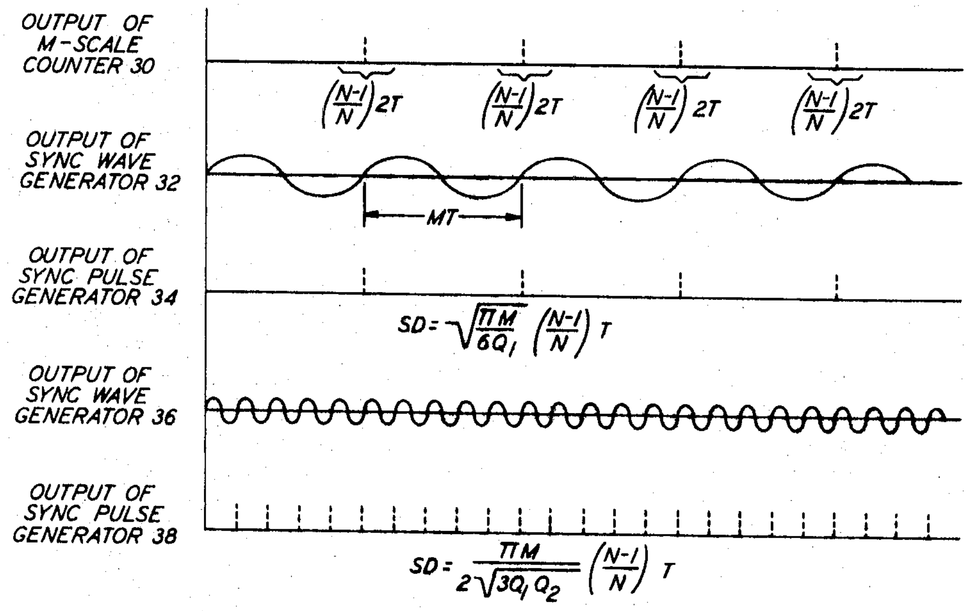

The dashed vertical lines in the topmost representation of FIG. 4 indicate the centers of the time intervals within which output signals from the M-scale counter 30 shown in FIG. 1 occur. Each of these lines marks the center of a range that extends over $$\left(\frac{N-1}{N}\right)2T$$

or 150 nano-seconds. Each of these ranges corresponds to the interval described above and shown in enlarged form in the bottommost waveform of FIG. 3.

In accordance with the principles of the present invention, the output pulses provided by the M-scale counter 30 are applied to the synchronization wave generator 32. The generator 32 comprises a resonant circuit characterized by a period MT and a quality factor $Q_1$. The output waveform excited in the generator 32 in response to driving pulses from the counter 30 is represented in the second row of FIG. 4. Although the driving pulses from the counter 30 do not have an exact periodicity but fluctuate at random with a prescribed deviation, it is known that such pulses are capable of exciting a resonant wave whose phase will deviate by a lesser amount. This phenonmenon is described in Rowe, H. E., "Timing in a Long Chain of Regtnerative Binary Repeaters," Bell System Technical Journal, vol. 37, No. 6, pages 1543–1598. It is a condition of such a smoothing action that the fluctuations in time of the driving pulses be substantially less than (approximately 1/10 of) a period of the excited wave. This condition is met by the particular parameters specified above and embodied in the waveforms of FIG. 4.

As mentioned above, the output pulses from the counter 30 are distributed in the interval $$\pm\left(\frac{N-1}{N}\right)T$$

Accordingly, the standard deviation (SD) of these pulses is $$\frac{1}{\sqrt{3}}\left(\frac{N-1}{N}\right)T$$

The resonant generator 32 reduces this deviation to $$\sqrt{\frac{\pi M}{6Q_1}}\left(\frac{N-1}{N}\right)T$$

Hence, this second-mentioned deviation is also applicable to the output of the synchronization pulse generator 34 which provides an output pulse in response to each positive-going zero-crossing of the output of the generator 32. In turn, the output of the generator 34 (represented in the third row of FIG. 4) is applied to the synchronization wave generator 36 which comprises a resonant circuit having a period T and a quality factor $Q_2$. These driving pulses are effective to excite oscillations in the generator 36 and, since the deviation of these driving pulses is sufficiently small relative to the period T to satisfy the criterion specified above, the phase of the wave excited in the generator 36 will deviate by an amount that is less than that of the driving pulses therefor. In particular, the standard deviation of the output of the generator 36 (and thus also of the generator 38 which provides an output pulse in response to each positive-going zero-crossing of the output of the generator 36) is $$\frac{\pi M}{2\sqrt{3Q_1Q_2}}\left(\frac{N-1}{N}\right)T$$

The last-specified standard deviation can be made as small as desired by using high-Q circuits. In order to ensure that the digital output signal provided by the herein-described encoder does not drift by as much as one level, the following relationships should hold $$\frac{\pi M}{2\sqrt{3Q_1Q_2}}\left(\frac{N-1}{N}\right)T<\frac{T}{N} \quad (10)$$

$$Q_1Q_2>\frac{\pi}{12}M^2(N-1)^2 \quad (11)$$

In the particular example considered herein, whrein N=4 and M=5, $Q_1=Q_2=10$ would satisfy inequality (11). For a larger number of encoding levels, higher-Q circuits would be required.

Thus, in accordance with the principles of the present invention, the generator 38 provides a train of pulses characterized by a period T which are applied to synchronize the sampling generator 24. In turn, the generator 24 is thereby precisely controlled to periodically read out the contents of the N-scale counter 22 in a highly reliable and accurate manner.

It is to be understood that the above-described arrangements are only illustrative of the application of the principles of the present invention. In accordance with these principles numerous other arrangements may be devised by those skilled in the art without departing from the spirit and scope of the invention. For example, since, as described above, the output of the oscillator 20 has embodied therein synchronization information, the illustrative arrangement shown in FIG. 1 is well suited to be operated as a transmission or telemetry system. In such a system the connection between the oscillator 20 and the counter 22 would constitute a transmission medium suitable for propagating the frequency-modulated signal output of the oscillator 20 to a remotely-located counter 22. A significant advantage of such a system is that it is not necessary therein to transmit framing or synchronization information separately over the medium.

What is claimed is:

1. Apparatus for converting an input analog signal to a digital representation thereof, said apparatus comprising:

means including a variable-frequency oscillator responsive to said input signal for generating signals whose frequency at any instant is proportional to the corresponding time rate of change of said input signal, unidirectional recycling means for counting the number of signals supplied by said generating means, means for successively sampling the indications registered in said counting means to provide digital counterparts of successive portions of said input signal, and means for counting the successive recyclings of said first-mentioned counting means and for generating in response thereto synchronizing signals for said sampling means.

2. In combination in an analog-to-digital encoder, means characterized by a specified center frequency and responsive to an analog signal to be encoded for providing variable-frequency output signals whose frequency in successive intervals of time are functions of the corresponding values of said analog signal in said intervals, recycling means for counting said variable-frequency signals in accordance with a specified modulus, means for periodically sampling the count registered in said counting means, and means responsive to the output of said counting means for synchronizing said sampling means with respect to the center frequency of said means for providing variable-frequency output signals.

3. A combination as in claim 2 wherein said recycling means comprises a unidirectional N-modulus counter, where N is a positive integer greater than one.

4. A combination as in claim 3 wherein said synchronizing means includes a unidirectional recycling M-modulus counter for counting recyclings of said N-modulus counter, where M is a positive integer greater than N, and means responsive to the output of said M-modulus counter for reducing the deviations in the times of occurrence of said last-mentioned recyclings, thereby to supply pulses whose deviations from the ideal are sufficiently small to accurately synchronize said sampling means.

5. A combination as in claim 4 wherein said reducing means comprises the following elements connected in tandem in the listed order between said M-modulus counter and said sampling means:

a first synchronization sine-wave generator characterized by a quality factor $Q_1$ and a period M, where T is the ideal sampling period of said sampling means, a first synchronization pulse generator for providing a pulse in response to each positive-going zero-crossing of the wave supplied by said first sine-wave generator, a second synchronization sine-wave generator characterized by a quality factor $Q_2$ and a period T, and a second synchronization pulse generator for providing a pulse in response to each positive-going zero-crossing of the wave supplied by said second sine-wave generator.

the product of the quality factors of said first and second sine-wave generators being selected to be greater than the quantity $$\frac{\pi}{12}M^2(N-1)^2.$$

References Cited

UNITED STATES PATENTS

| | | | |
|---|---|---|---|
| 3,375,351 | 3/1968 | Deavenport et al. | 340—347X |
| 3,449,725 | 6/1969 | Eckelkamp et al. | 340—347X |

MAYNARD R. WILBUR, Primary Examiner

C. D. MILLER, Assistant Examiner